(12) United States Patent
Patel et al.

(10) Patent No.: US 9,286,608 B1
(45) Date of Patent: *Mar. 15, 2016

(54) SYSTEM AND METHOD FOR PREDICTIVE PAYMENT AUTHORIZATIONS

(75) Inventors: Rajesh Shanker Patel, Bellevue, WA (US); Bryan C. Castillo, Brier, WA (US); David M. Packard, Kent, WA (US); Arun Antony Mathews, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 695 days.

This patent is subject to a terminal disclaimer.

(21) Appl. No.: 13/019,903

(22) Filed: Feb. 2, 2011

Related U.S. Application Data

(63) Continuation-in-part of application No. 12/981,344, filed on Dec. 29, 2010, now Pat. No. 8,401,970.

(51) Int. Cl.
*G06Q 40/00* (2012.01)
*G06Q 20/40* (2012.01)
(Continued)

(52) U.S. Cl.
CPC .............. *G06Q 20/40* (2013.01); *G06Q 20/405* (2013.01); *G06Q 20/10* (2013.01); *G06Q 20/204* (2013.01);
(Continued)

(58) Field of Classification Search
CPC ..... G06Q 20/40; G06Q 20/405; G06Q 20/10; G06Q 20/28; G06Q 20/401; G06Q 30/0222; G06Q 20/38; G06Q 20/204; G06Q 40/00
USPC .................. 902/2–41; 705/38, 39, 41, 44, 35, 705/64–79
See application file for complete search history.

(56) References Cited

U.S. PATENT DOCUMENTS 6,324,526 B1 * 11/2001 D'Agostino ........... G06Q 20/02
235/375
7,451,114 B1 * 11/2008 Matsuda ................ G06Q 20/04
705/35
(Continued)

OTHER PUBLICATIONS

Punch, L. (2002). PayPal under the microscope. Credit Card Management, 15(5), 24-27. Retrieved from http://search.proquest.com/docview/201131694?accountid=14753 retrieved on Oct. 28, 2015.*
(Continued)

*Primary Examiner* — Kito R Robinson
(74) *Attorney, Agent, or Firm* — Robert C. Kowert; Meyertons, Hood, Kivlin, Kowert & Goetzel, P.C.

(57) ABSTRACT

Embodiments may include a payment management system that receives information indicating a first transaction is to be initiated, the information specifying a first quantity of funds. The system may determine that an additional transaction for a respective quantity of funds is expected to be initiated within a given time period. The system may, prior to initiation of the additional transaction, generate a payment authorization request for a combined quantity of funds equal to at least a sum of the first quantity of funds and the respective quantity of funds of the additional transaction. The system may, subsequent to receiving information indicating that a payment authorization for the combined quantity of funds was issued and subsequent to receiving information indicating that the additional transaction is to be initiated, initiate settlement of the first transaction and the at least one additional transaction using the combined quantity of funds of the payment authorization.

21 Claims, 15 Drawing Sheets

(51) Int. Cl.
*G06Q 20/38* (2012.01)
*G06Q 20/20* (2012.01)
*G06Q 30/02* (2012.01)
*G06Q 20/28* (2012.01)
*G06Q 20/10* (2012.01)

(52) U.S. Cl.
CPC .............. *G06Q 20/28* (2013.01); *G06Q 20/38* (2013.01); *G06Q 20/401* (2013.01); *G06Q 30/0222* (2013.01); *G06Q 40/00* (2013.01)

(56) References Cited

U.S. PATENT DOCUMENTS

| | | | | |
|---|---|---|---|---|
| 8,296,235 | B2* | 10/2012 | Hrabosky | ........................ 705/44 |
| 2001/0032165 | A1 | 10/2001 | Friend et al. | |
| 2003/0195843 | A1* | 10/2003 | Matsuda | ................ G06Q 20/04 705/39 |
| 2003/0233334 | A1* | 12/2003 | Smith | ................... G06Q 20/04 705/75 |
| 2006/0235747 | A1* | 10/2006 | Hammond | ............. G06Q 10/10 705/14.24 |
| 2006/0242028 | A1* | 10/2006 | Walker et al. | ................... 705/26 |
| 2007/0106607 | A1* | 5/2007 | Seib | ..................... G06Q 20/102 705/40 |
| 2007/0250440 | A1 | 10/2007 | Paulsen et al. | |
| 2007/0250443 | A1* | 10/2007 | Hoyos | .................... G06Q 20/40 705/44 |
| 2009/0076966 | A1* | 3/2009 | Bishop | ................. G06Q 20/027 705/67 |
| 2010/0030688 | A1* | 2/2010 | Patterson | ............... G06Q 20/02 705/44 |
| 2010/0312636 | A1* | 12/2010 | Coulter | .................. G06Q 20/10 705/14.38 |
| 2012/0036073 | A1* | 2/2012 | Basu et al. | ..................... 705/44 |

OTHER PUBLICATIONS

Gart, A. (1992). How technology is changing banking. Journal of Retail Banking, 14(1), 35-35. Retrieved Oct. 26, 2012.

U.S. Appl. No. 12/981,344, filed Dec. 29 2010, Rajesh Shanker Patel et al.

* cited by examiner

SYSTEM AND METHOD FOR PREDICTIVE PAYMENT AUTHORIZATIONS

This application is a continuation-in-part of pending U.S. patent application Ser. No. 12/981,344 (filed on Dec. 29, 2010) entitled "System and Method for Reusing Payment Authorizations," the entire content of which is incorporated herein by reference.

BACKGROUND

Electronic marketplaces, such as those accessible via the Internet, may include a catalog of items or products available for purchase. These items may be offered as the basis for commerce (e.g., sale or trade). In one example, customers may utilize a web browser to visit a merchant's website, select an item for purchase from the catalog, and engage in a checkout process to finalize an order for the item. The merchant may operate a fulfillment network including various facilities in order to process such orders. For instance, the merchant may operate one or more facilities for preparing shipments of purchased items. The merchant may rely on shipment carriers to deliver the shipments to the respective purchasing customers.

In the aforesaid checkout process, customers may present one or more payment instruments to the merchant, such as a credit card or other financial instrument that may be debited electronically. In most cases, merchants do not accept payment information on face; a payment verification process may be performed to ensure that the requisite funds are available in the account represented by the customer's payment instrument. In some cases, the merchant may reserve a quantity of funds equal to or greater than the total cost of a customer's order. In many cases, this reservation may persist until settlement of the respective transaction or until a predetermined expiration deadline. In cases where a reservation persists until the predetermined expiration deadline (e.g., as might happen if an order is canceled), the customer may be prohibited from using the reserved funds for other purposes until after that expiration deadline.

Figure 1:
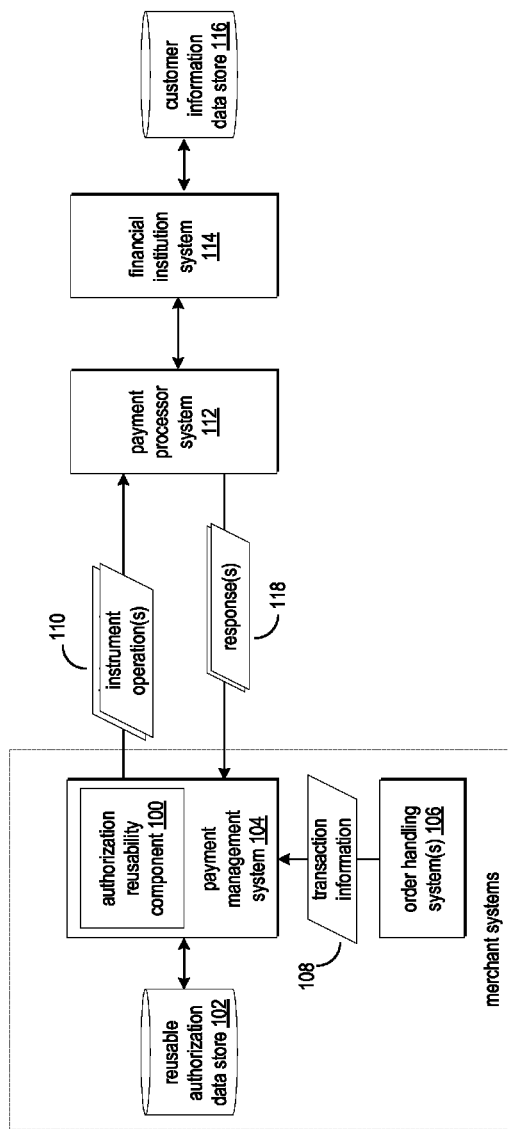
FIG. 1 illustrates a block diagram of a payment management system including an authorization reusability component, according to some embodiments.

While the system and method for predictive payment authorizations is described herein by way of example for several embodiments and illustrative drawings, those skilled in the art will recognize that the system and method for predictive payment authorizations is not limited to the embodiments or drawings described. It should be understood, that the drawings and detailed description thereto are not intended to limit the system and method for predictive payment authorizations to the particular form disclosed, but on the contrary, the intention is to cover all modifications, equivalents and alternatives falling within the spirit and scope of the system and method for predictive payment authorizations as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method for predictive payment authorizations are described. Embodiments may include an authorization reusability component which may be configured as part of a payment management system. In one example, such a payment management system may be used by a merchant to process transactions associated with customer orders. For transactions processed by the payment management system, the authorization reusability component may create and/or maintain respective payment authorization records that enable the payment management system to reuse payment authorizations when applicable. For instance, some time after the payment management system has already obtained a payment authorization for a transaction, one or more events may cause all or a portion of the funds reserved by that authorization to go unneeded. In one example, all or a portion of an order associated with the transaction may be canceled by the customer. In various embodiments, when such events occur, the authorization reusability component may update an availability status for the respective reserved funds in a payment authorization record associated with the transaction. For instance, prior to the event (e.g., prior to a full or partial order cancellation), such a payment authorization may indicate that a quantity of funds have been reserved for a first transaction. After the event, the authorization reusability component may change an availability status of the payment authorization record to indicate that some or all of the reserved funds are now available to be reassigned to other transactions. In some cases, the authorization reusability component may implement restrictions on which transactions may use the newly available funds (described in more detail below), but generally the authorization reusability component may be configured to reassign the available funds to some other transaction. This reassignment process may save transaction fees for the merchant as the merchant, by reusing at least some existing payment authorizations, may be able to decrease the number of new payment authorization requests to a payment processing entity, which may charge a fee for such requests.

The reassignment of payment authorizations may also improve the customer experience by preventing or reducing the unnecessary utilization of payment instrument limits (e.g., an available credit limit). For example, each payment authorization may correspond to a respective utilization of a customer's payment instrument limit (e.g., a $50 payment authorization would decrease an available credit limit of $200 down to $150). By reusing existing payment authorizations to minimize the use of new payment authorizations, embodiments may in many cases avoid unnecessarily utilizing a customer's payment instrument limits. In the example above, absent the payment authorization reuse techniques described herein, certain events (e.g., an item/order cancellation or reassignment of shipment preparation from one facility to another, as described in more detail below) may cause redundant utilization of a customer's payment instrument. Within the context of the example above, the customer's available credit limit might be reduced from $200 to $100 for a $50 dollar purchase, which may cause inconvenience to the customer. For instance, if the customer attempted to purchase a subsequent item for $110 (not knowing about the unnecessary and redundant utilization of his available credit limit), the customer's payment instrument may be declined thus causing unnecessary inconvenience to the customer.

In various embodiments, predictive techniques may be utilized to share payment authorizations across multiple transactions. These techniques may utilize knowledge of transactions that are expected to occur in the future in order to generate an authorization request for a quantity of funds predicted to be needed in the future (e.g., a quantity of funds sufficient for at least one current transaction and at least one transaction expected to be initiated in the future).

FIG. 1 illustrates a block diagram of system including an authorization reusability component, according to some embodiments. In the illustrated embodiments, an order handling system 106 may be configured to receive one or more customer orders. In various embodiments, these orders may originate from a different sources including but not limited to online or network-based marketplaces. In some embodiments, a merchant may operate one or more network-accessible servers that implement an electronic commerce portal where customers may browse a catalog of product detail pages. Such a portal may enable the customers to select one or more items for purchase as part of a customer order submitted to the merchant. In various embodiments, the merchant may receive orders for one or more items through other channels.

For a given order, order handling system 106 may be configured to generate transaction information 108 that specifies the transaction or transactions that may be carried out for a given order. This information may also specify one or more operations (e.g., an initiate transaction, finalize transaction, etc.) for the payment management system. In some embodiments, the order handling system may designate one transaction as payment for an entire order. In other cases, order handling system may designate multiple transactions as collectively representing payment for an entire order. In one example, the merchant may fulfill orders through a network of materials handling facilities. In this example, the order handling system may split an order into multiple transactions based on how the order is actually processed in the merchant's network of facilities. In one non-limiting example, for an order including multiple items, shipments including different subsets of those items may be prepared at different facilities within the merchant's network. In this example, the order handling system may structure the transactions for the order such that each shipment is handled by a separate transaction. In other cases, all items of an order may be handled by a single transaction irrespective of where the shipments for that order are prepared.

Whether one or multiple transactions are used to pay for an order, the order handling system 106 may provide the relevant transaction information to payment management system 104, as illustrated by transaction information 108. For a given transaction, transaction information 108 may specify the quantity of funds needed, the payment instrument to be used (e.g., a credit card, debit card, or gift card) and any relevant information needed to charge or debit the funds from the account associated with the payment instrument (e.g., the instrument holder's name, the instrument's expiration date, a card security code (e.g., a CVV code), etc.).

In various embodiments, payment management system 104 may carry out transactions in accordance with transaction information 108. For a given transaction, this may include submitting one or more instrument operations 110 to a payment processor system 112 of a payment processing entity. Instrument operations 110 may include but are not limited to requests for payment authorization or transaction settlement. Payment processor system 112 may provide one or more respective responses 118 to the payment management system, which may indicate operation failure or success (e.g., failure or success of authorizations or settlements).

In various embodiments, payment processor system 112 may communicate with financial institution system 114 (which may have issued the payment instrument used in the transaction) to verify availability of funds and/or to reserve funds for the transaction prior to settlement. The financial institution system 114 may store information about different payment instrument holders in customer information data store 116. This information may include but is not limited to customer information (e.g., name and contact information), account information (account numbers, available and posted balances), and information about existing reservations on funds (e.g., for pending transactions).

Authorization reusability component 100 may be the portion of payment management system 104 responsible for managing the reusability of payment authorizations as well as reusable authorization data store 102. In various embodiments, authorization reusability component 100 may be configured to create and or maintain payment authorization records stored in reusable authorization data store 102. As described in more detail below with respect to subsequent Figures, authorization reusability component 100 may also be configured to implement logic for determining, for a given transaction, whether to seek a new payment authorization or to use an existing payment authorization. In some cases, authorization reusability component 100 may determine that multiple existing and/or new authorizations should be utilized.

Figure 15:
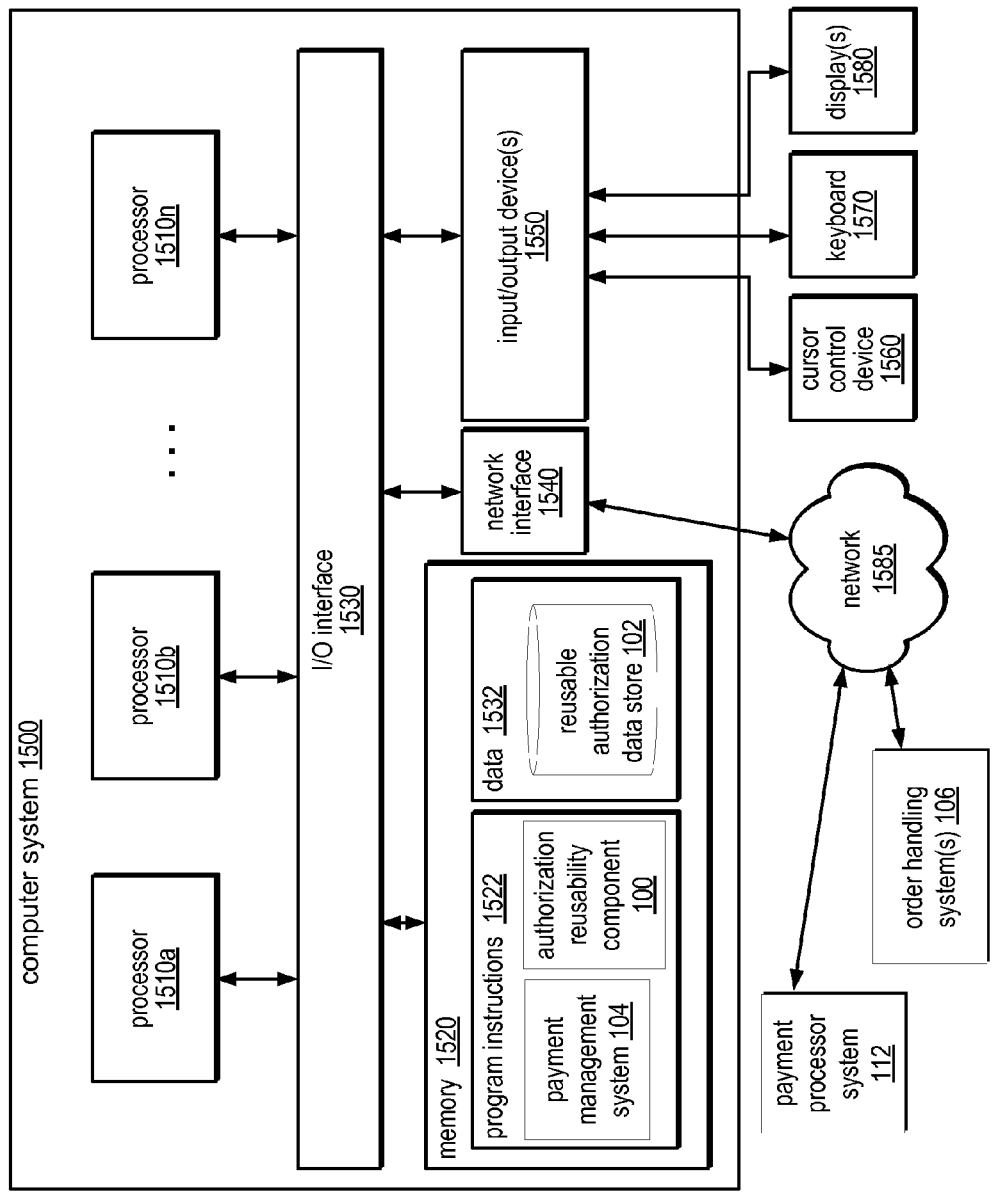
FIG. 15 illustrates one example of a computer system suitable for implementing various elements of the system and method for predictive payment authorizations, according to some embodiments.

It should also be noted that any given component or system described herein may be implemented on one or more computers, such as computer system 1500 of FIG. 15. For instance, the illustrated systems and components of FIG. 1 may be implemented as processor-executable instructions stored in memory. In various embodiments, any of the communications or data transfers described herein may be performed over one or more electronic networks, such as network 1585 of FIG. 15.

Figure 2:
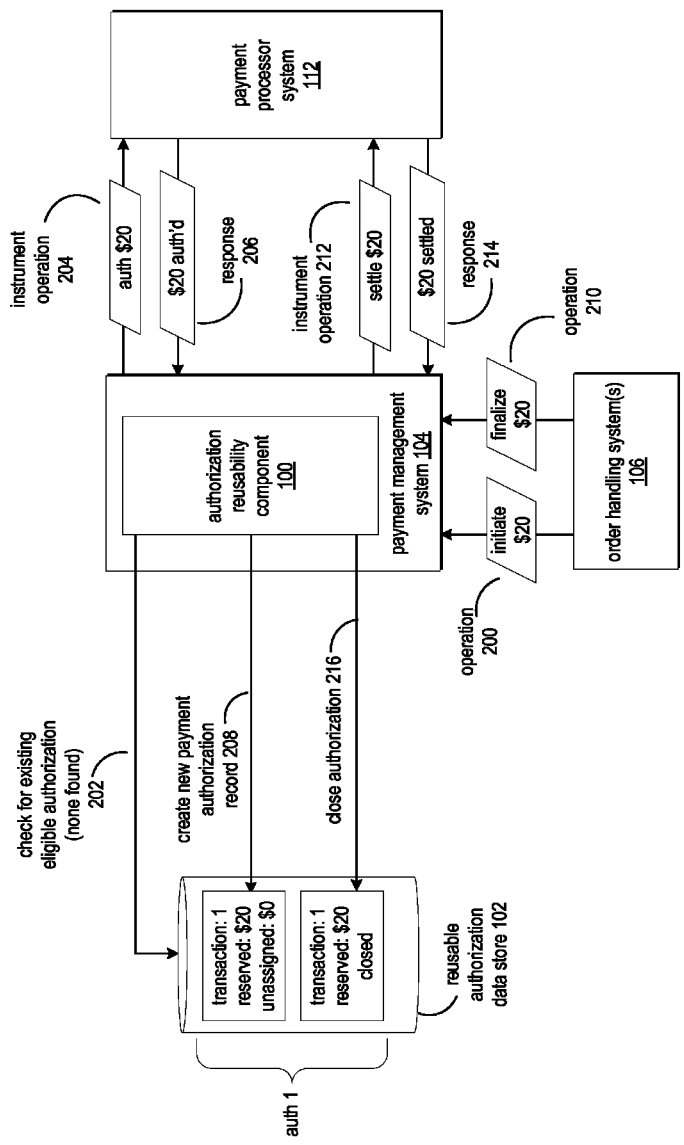
FIG. 2 illustrates a flow diagram for processing a payment authorization in the absence of an order cancellation or similar event, according to some embodiments.

FIG. 2 illustrates a flow diagram of an example process according to which payment management system 104 may handle payment authorizations in the absence of an item cancellation or order cancellation (or similar event). In the illustrated embodiment, certain actions or operations may be described as being performed by the payment management system 104 or authorization reusability component 100. It should be understood that such description is non-limiting in nature. Indeed, in some embodiments, authorization reusability component 100 may be configured to perform actions attributed to the payment management system and vice versa. In some cases, there may be no distinction between the authorization reusability component and the payment management system. For instance, in some embodiments, these components may be tightly integrated together as a single component or system.

The illustrated flow may be begin at operation 200 issued by order handling system 106. Order handling system 106 may issue this transaction when a shipment corresponding to the transaction is assigned to a materials handling facility in the merchant's fulfillment network, for example. (In various embodiments, a materials handling facility may include one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items.) In the illustrated embodiment, this operation indicates a transaction for $20 is to be initiated ($20 is merely an example amount). This operation may also include various metadata not illustrated, such as an order identifier or transaction identifier to identify the associated order or transaction, respectively. In the illustrated embodiment, instead of payment management system immediately performing an authorization in response to the initiate operation, authorization reusability component 100 may be configured to first check for any existing authorizations that are eligible to be used for the transaction, as illustrated at 202. In this particular case, there are no existing authorizations that are eligible to be used for the transaction. (Other situations that include at least one eligible authorization are described with respect to subsequent Figures.) In response to the aforesaid determination, payment management system 104 may request authorization for $20. Upon receiving a successful response 206 indicating that the requisite funds have been authorized (e.g., that the requisite funds have been authorized and reserved at the respective financial institution).

In response to the successful authorization, authorization reusability component 100 may generate a new payment authorization record 208, which may be stored in reusable authorization data store 102. In various embodiments, reusable authorization data store 102 may store any number of similar payment authorization records generated by the authorization reusability component 100. As illustrated, the payment authorization indicates that a quantity of funds of a financial account have been reserved as a form of payment for the transaction between the merchant and the customer that placed the order with the merchant. In the illustrated embodiments, this indication is shown as the reservation of $20. The payment authorization record may also include an availability status indicating whether at least a portion of the reserved funds are unassigned to a specific transaction. In the illustrated embodiment, this status is designated by the indication that $0 (of the reserved funds) are unassigned. In other words, in the illustrated example, all of the reserved funds are assigned to the respective transaction.

In various embodiments, there may be events that cause a transaction to require less funds than previously required (e.g., an item or order cancellation) prior to transaction settlement. In the illustrated embodiment, this is not the case. (However, subsequent Figures address this situation.) No such events occur prior to order handling system 106 issuing the finalize operation in the amount of $20, as illustrated at operation 210. In response to receiving notice of this operation, payment management system 104 may send a settle request in the full amount of $20 to payment processor system 112, as illustrated by instrument operation 212. Upon successful settlement, payment processor system 112 may provide a response 214 to the payment management system to indicate that the settlement is complete. In response, payment management system 104 may close the authorization at 216 by updating the availability status of the stored payment authorization record 208 stored in data store 102. For instance, payment management system 104 may update the status of the payment authorization record 208 to indicate that the reserved funds have been utilized and are no longer available to be assigned to a transaction (e.g., as a result of transaction settlement). In some embodiments, the payment authorization may be designated as closed at other times. For instance, a payment authorization may be designated as closed prior to performing instrument operation 212 and receiving response 214. Closing the payment authorization in this manner may prevent conflicts among different transactions competing for the same payment authorizations. For instance, closing the payment authorization prior to performing the settlement operations with the payment processing entity may ensure that the payment authorization is not assigned to some other transaction while the payment management system is performing operation 212 and receiving response 214.

In the illustrated embodiment of FIG. 2, the transaction corresponding to the authorization is carried out for the full amount authorized at 204-206. In some case, events may occur that cause the transaction to require fewer funds than originally authorized for the transaction. One example of such an event includes a customer canceling one or more items from the order submitted to the merchant. In another example, such an event may include the customer cancelling the entire order altogether. In other cases, such an event may include the merchant cancelling one or more of the items (up to the entire order). For instance, the merchant may determine that inventory levels for the ordered item(s) are not sufficient to fulfill the order, and may cancel or delay the fulfillment of the items. In another example, one or more items of the order may be damaged in one of the merchant's facilities before being shipped. To avoid shipping a damaged item to the customer, the merchant may cancel or delay the preparation of such items for shipment. In yet another example, such an event may include the merchant altering the facility at which an item is prepared for shipment. For instance, after an item has been assigned to one facility for shipment preparation, the merchant may determine that it is more economical to prepare a shipment of the item from another facility (e.g., due to savings realized from grouping with other items to be shipped, due to savings associated with the proximity of the second facility to the customer, or due to routing considerations, etc.). In some cases, order handling system 106 may handle items fulfilled at different facilities as being associated with different transactions. For instance, in instances where the shipment preparation of an item is moved from a first facility to a second facility, the order handling system may cancel the original transaction (associated with the shipment preparation of the item at the first facility) and generate a new transaction for a shipment of the item (e.g., a different unit of the same item) being prepared at the second facility. In other embodiments, items moved from one facility to another may be handled under the same transaction. In some cases, events other than those described above may cause a transaction to require fewer funds than originally authorized for the transaction. It is the intention of various embodiments to include all such scenarios.

Figure 3:
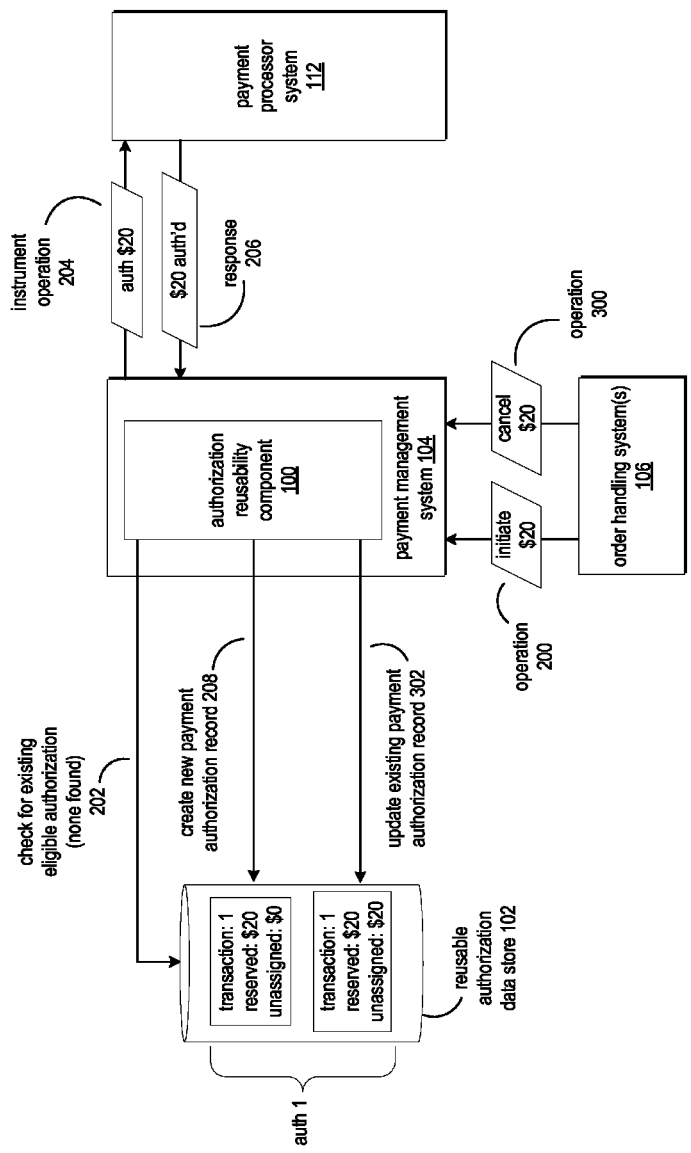
FIG. 3 illustrates a flow diagram for updating a payment authorization record subsequent to an event that causes a transaction to require fewer funds than originally authorized, according to some embodiments.

FIG. 3 illustrates a flow diagram of the payment management system operation in the presence of full cancellation of the funds originally authorized for the transaction. In the illustrated embodiment of FIG. 3, operations 200-208 may be substantially similar to the like numbered operations described above with respect to FIG. 2. The description of FIG. 3 will begin at operation 300, which occurs subsequent to the creation of a payment authorization record for the respective transaction, as illustrated at 208. At operation 300, order handling system 106 may issue a cancel operation for the transaction. For instance, order handling system 106 may issue such an operation in response to determining that any of the events described above have occurred (e.g., a customer or the merchant may have fully or partially canceled an order). In response to the cancel operation, authorization reusability component 100 may update the associated payment authorization record for the transaction as illustrated at 302. As can be seen, authorization reusability component 100 may modify the payment authorization record such that the availability status of the record indicates that $20 (i.e., the full quantity of funds originally authorized for the transaction) of the authorization is now unassigned (e.g., not assigned to a transaction). As described in more detail below, funds that have been authorized but are unassigned may be reassigned to a different transaction. In various embodiments, such opportunistic reassignment of funds may be tantamount to reusing authorizations because, in conventional systems, authorizations are typically left to expire once an order is canceled (or once a similar event occurs).

Figure 4:
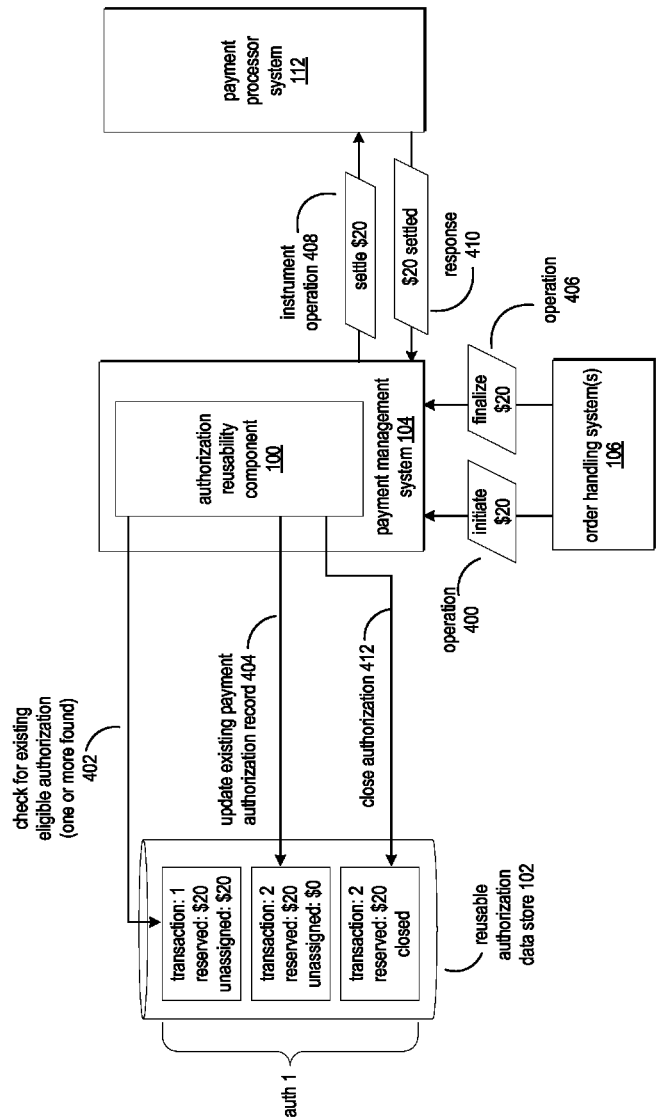
FIGS. 4-6 illustrate flow diagrams for reusing a payment authorization for varying transaction settlement amounts, according to some embodiments.

FIG. 4 illustrates an example flow for reusing an existing authorization. In the illustrated embodiment, the temporal state of the flow can be assumed to follow that illustrated in FIG. 3 described above. In the illustrated embodiment, order handling system 106 may issue an initiate operation in the amount of $20 for a second transaction, as illustrated at 400. Instead of immediately issuing an authorization request in response to operation 400, authorization reusability component 100 may instead check for existing eligible authorizations, as illustrated at 402. In the illustrated embodiment, authorization reusability component 100 locates an eligible existing payment authorization record in reusable authorization data store 102. In the illustrated embodiment, such payment authorization record may be the payment authorization record last updated at action 302 of FIG. 3. Instead of acquiring a new authorization, authorization reusability component 100 may effectively reuse the existing authorization by reassigning the already authorized funds to the second transaction, as illustrated at 404. In the illustrated embodiment, the second transaction is also in the amount of $20; the payment authorization record is updated to indicate $0 remain unassigned to a transaction (i.e., all of the authorized funds have been allocated to a transaction).

After the existing payment authorization record is updated, the order handling system may issue a finalize operation for the second transaction to payment management system 104, as illustrated at 406. The payment management system may settle the transaction at 408 and receive an acknowledgement of successful settlement at 410. In response, authorization reusability component 100 may update the payment authorization record to indicate the transaction has been closed and no authorized funds are available to be assigned to other transactions. Note that in the operations of FIG. 4, the illustrated system need not obtain a new authorization for transaction funds. As described above, this reassignment process may save transaction fees for the merchant as the merchant, by reusing at least some existing payment authorizations, may be able to decrease the number of new payment authorization requests to a payment processing entity, which may charge a fee for such requests.

Figure 5:
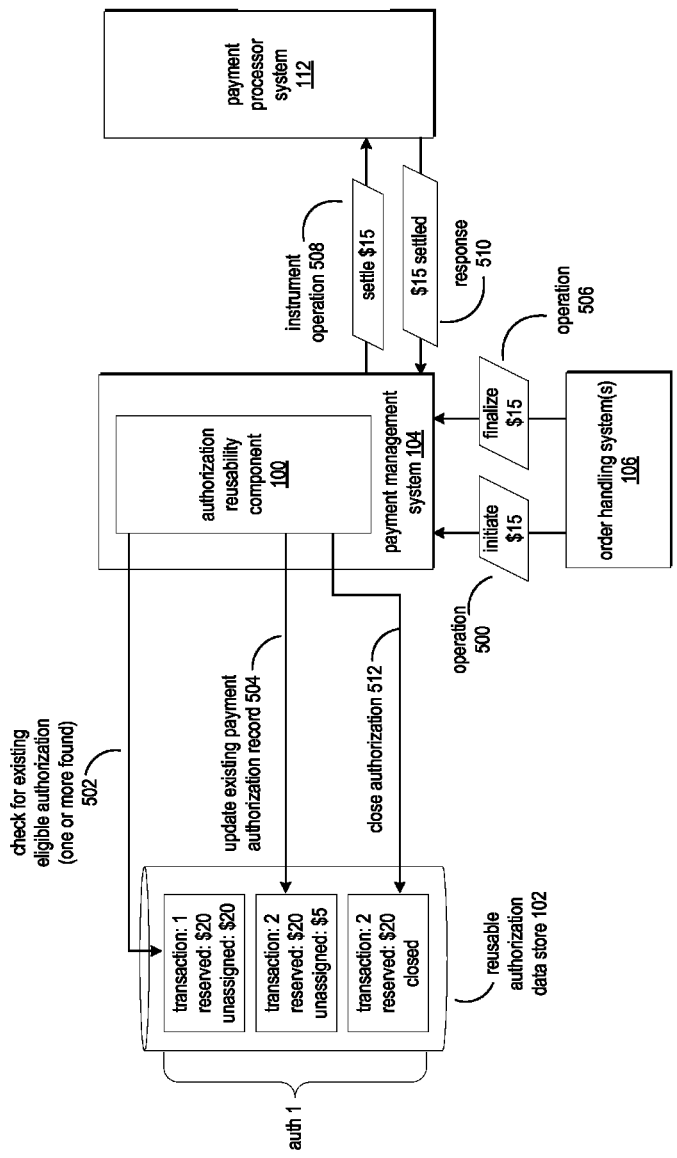

In various embodiments, the quantity of funds ultimately settled need not exactly match the quantity of funds originally authorized. One example of this scenario is illustrated in FIG. 5. FIG. 5 illustrates an example flow for reusing an existing authorization when the amount of funds to be settled is less than the original amount authorized. In the illustrated embodiment, the temporal state of the flow can be assumed to follow that illustrated in FIG. 3 described above. In the illustrated embodiment, order handling system 106 may issue an initiate operation in the amount of $15 for a second transaction (an amount of funds less than the original authorization amount of $20), as illustrated at 500. Instead of immediately issuing an authorization request in response to operation 500, authorization reusability component 100 may instead check for existing eligible authorizations, as illustrated at 502. In the illustrated embodiment, authorization reusability component 100 locates an eligible existing payment authorization record in reusable authorization data store 102. In the illustrated embodiment, such payment authorization record may be the payment authorization record last updated at action 302 of FIG. 3. Instead of acquiring a new authorization, authorization reusability component 100 may effectively reuse the existing authorization by reassigning the already authorized funds to the second transaction, as illustrated at 404. In the illustrated embodiment, the second transaction is for an amount of $15; the payment authorization record is updated to indicate $5 remain unassigned to a transaction (i.e., $15 of the authorized funds have been assigned to a transaction).

Subsequent to the existing payment authorization record being updated, the order handling system may issue a finalize operation for the second transaction to payment management system 104, as illustrated at 506. The payment management system may settle the transaction at 508 and receive an acknowledgement of successful settlement at 510. In response, authorization reusability component 100 may update the payment authorization record to indicate the transaction has been closed and no authorized funds are available to be assigned to other transactions. In various embodiments, the excess amount of funds that went unused (e.g., the $5 that remained unassigned to a transaction at the time of settlement) may be released to the account holder (e.g., the reservation on the $5 may be removed). Note that in the operations of FIG. 5, the illustrated system need not obtain a new authorization for transaction funds. As described above, this reassignment process may save transaction fees for the merchant as the merchant, by reusing at least some existing payment authorizations, may be able to decrease the number of new payment authorization requests to a payment processing entity, which may charge a fee for such requests.

While FIG. 5 illustrates a scenario in which the quantity of funds finalized (e.g., as specified by operation 506) is equivalent to the quantity of funds initiated (e.g., as specified by operation 500), there may be circumstances in which the amount finalized is less than the amount initiated. For instance, a cancellation of an item may cause the finalize operation to call for less funds than originally initiated. For example, if a $2 item were canceled from the corresponding order (e.g., by the customer or by the merchant), operation 506 could instead call for $13 (i.e., the initialization amount less the cost of the canceled item) to be finalized instead of $15. In some cases, the processing of the transaction may proceed as illustrated in FIG. 5 wherein the corresponding payment authorization is closed. In other cases, settlement may be delayed such that the remaining unused funds (e.g., $2 in the example above) may be used for settling another transaction. Embodiments that utilize delayed settlement to share one payment authorization across multiple transactions are described in more detail below with respect to subsequent Figures.

Figure 6:
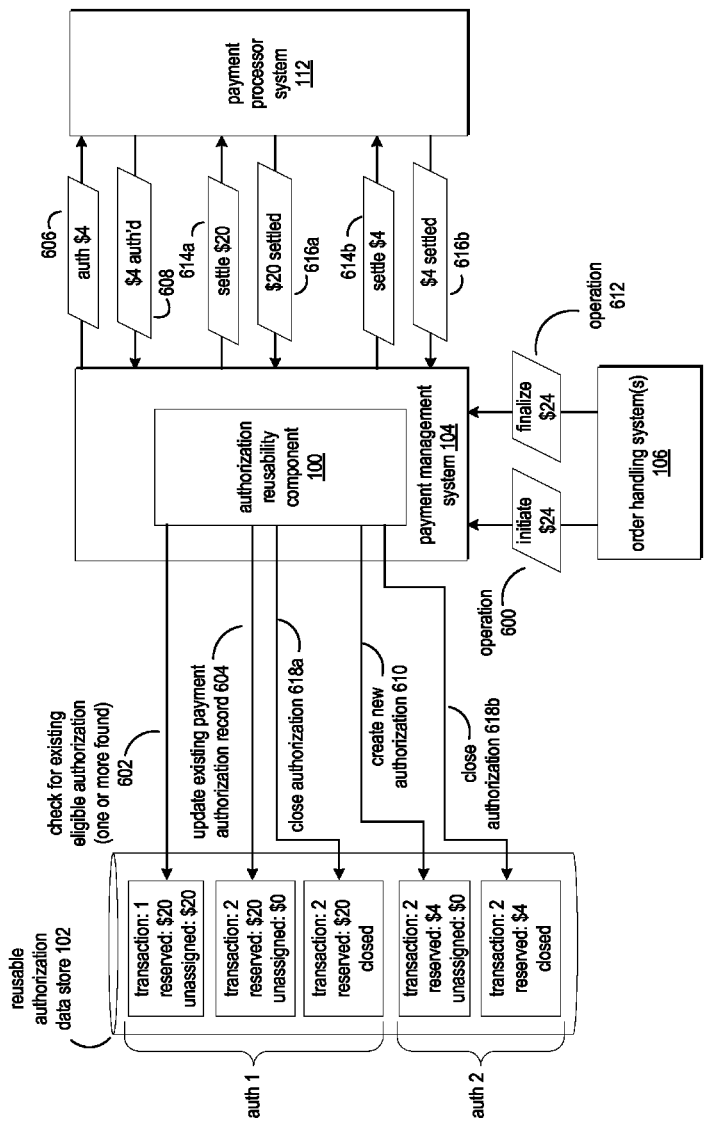

As described above, in various embodiments, the quantity of funds ultimately settled need not exactly match the quantity of funds originally authorized. Another example of this scenario is illustrated in FIG. 6. FIG. 6 illustrates an example flow for reusing an existing authorization when the amount of funds to be settled is greater than the original amount authorized. In addition to reusing an existing authorization, the illustrated embodiment includes the acquisition of another authorization for funds above and beyond the original authorization being used. As is the case with previous Figures, in the illustrated embodiment, the temporal state of the flow can be assumed to follow that illustrated in FIG. 3 described above. In the illustrated embodiment, order handling system 106 may issue an initiate operation in the amount of $24 for a second transaction (an amount of funds greater than the original authorization amount of $20), as illustrated at 600. Instead of immediately issuing an authorization request for the full $24 in response to operation 600, authorization reusability component 100 may instead check for existing eligible authorizations, as illustrated at 602. In the illustrated embodiment, authorization reusability component 100 locates an eligible existing payment authorization record in reusable authorization data store 102. In the illustrated embodiment, such payment authorization record may be the payment authorization record last updated at action 302 of FIG. 3. Instead of acquiring a new authorization in the full amount of $24, authorization reusability component 100 may effectively reuse an existing authorization by reassigning the already authorized funds to the second transaction, as illustrated at 604. As the second transaction is for an amount of $24; the payment authorization record is updated to indicate $0 remain unassigned to a transaction (i.e., $15 of the authorized funds have been assigned to a transaction). Additionally, since the existing payment authorization only covers $20 of the $24 needed, a new authorization is requested at 606. In response to a successful authorization, payment management system 104 may receive a response 608 that indicates the $4 in funds has been reserved. In response to this new authorization, authorization reusability component 100 may create a new payment authorization record as illustrated at 610 to indicate that $4 in funds has been reserved. As these funds are dedicated to the $24 transaction, the availability status of the payment authorization record for the second authorization is set to $0 to indicate that no funds of that authorization remain unassigned.

By reusing an existing authorization ("auth 1") for $20 in funds, the payment management system may avoid having to acquire a new authorization for the full amount of $24. Instead, the payment management system need only acquire a new authorization for the difference between the existing authorization and the $24 specified by operation 600. In various embodiments, this may save transaction costs for the merchant as some payment processing entities may charge higher fees for larger authorization amounts.

Some time after the existing payment authorization record is updated, the order handling system may issue a finalize operation for the second transaction to payment management system 104, as illustrated at 612. As the amount of the finalize operation ($24) is greater than any given one of the authorizations assigned to the transaction ($20 and $4, respectively), the payment management system may utilize multiple authorizations to settle the transaction. For instance, the payment management system may settle the transaction at 614a and 614b and receive acknowledgements of successful settlements at 616a and 616b. In response, authorization reusability component 100 may update both of the respective payment authorization records to indicate the transaction has been closed and no authorized funds are available to be assigned to other transactions, as illustrated at 618a and 618b.

Other variations on the example transactions described above and contemplated. In one example based on the illustrated embodiment of FIG. 6, the ultimate finalization amount may be less than the total funds authorization for the transaction. For instance, operation 612 may have specified that $22 was to be settled (instead of $24). For example, an item priced at $2 may have been canceled from the corresponding order. In this case, the transaction may be handled similarly, with the exception that final settlement will occur for $22 instead of $24. In this scenario, the $2 would not be made available to be reassigned to a new transaction; authorized funds that are not used at settlement time may be released back to the customer's financial account. In some embodiments, an alternative to this scenario may be employed. For instance, the payment management system may delay settlement until all of the funds associated with a payment authorization record can be used. For instance, if $5 of a $10 authorization are ready for settlement, the payment management system may delay settlement until the remaining $5 can be settled for a subsequent transaction. This may save the merchant transaction fees, as payment processing entities may charge fees on a per authorization basis in some cases. Examples of embodiments including delayed settlement are described in more detail with respect to subsequent Figures. In other cases, instead of a requirement to use all of the funds associated with a given payment authorization record, the payment management system may be configured to use an authorization as long as a requisite threshold amount will be settled. For instance, for an example threshold of 90% and an example authorization in the amount of $100, the payment management system may use such authorization as long as at least $90 of the authorization is settled.

Sharing a Payment Authorization with Multiple Transactions

Figure 7:
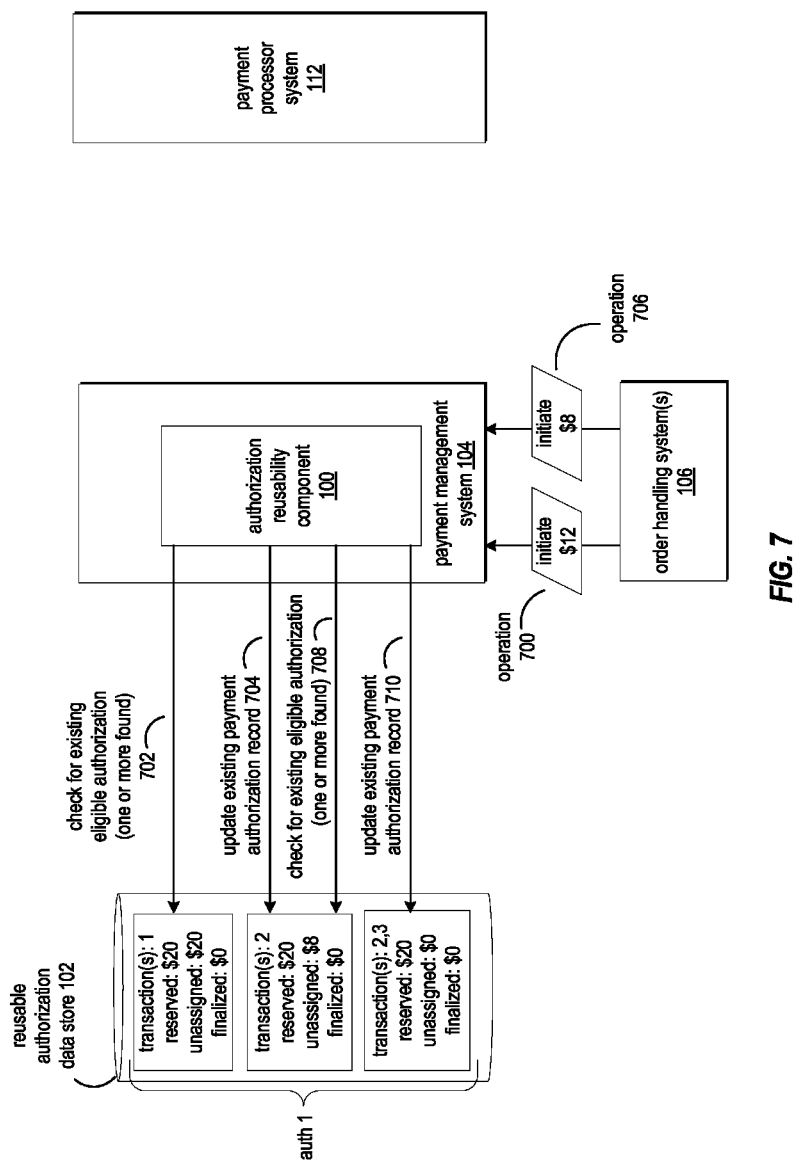
FIGS. 7-8 illustrate flow diagrams for sharing a payment authorization among multiple transactions by using a delayed settle, according to some embodiments.
Figure 8:
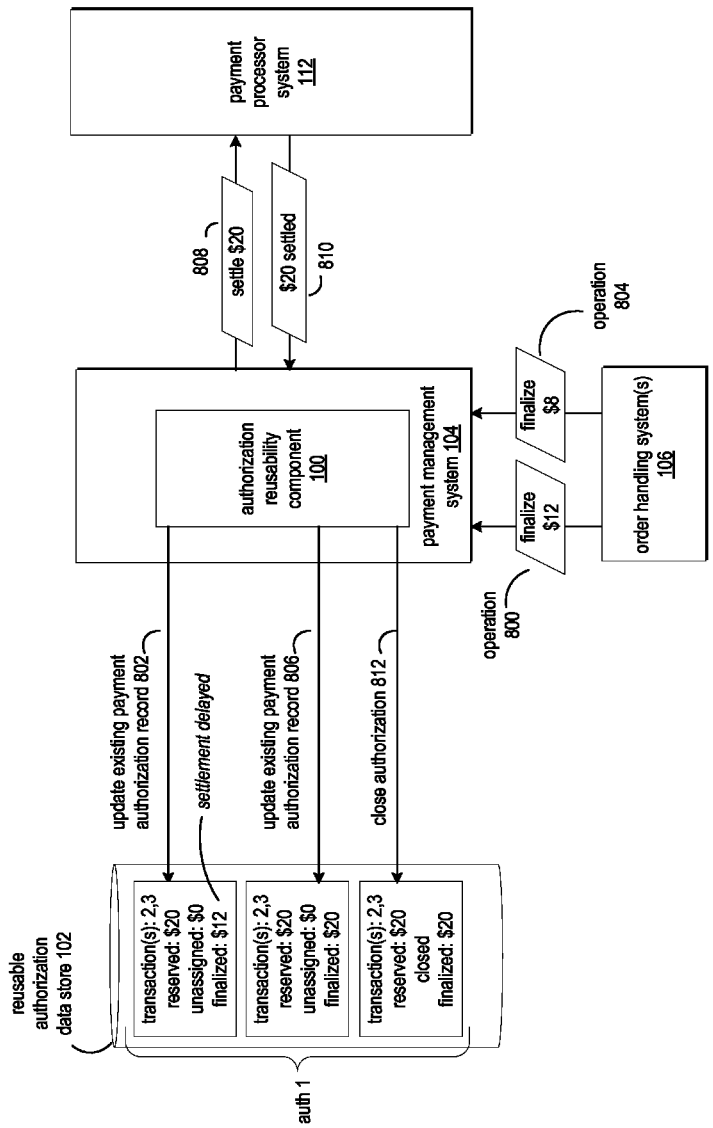

As described above, embodiments may enable multiple payment authorizations to be used for settling the same transaction, such as described above with respect to FIG. 6. In various embodiments, the same payment authorization may be used to fulfill the needs of multiple transactions. This process may be referred to herein as sharing a payment authorization among multiple transactions. FIG. 7 and FIG. 8 illustrate flow diagrams of one example for sharing a payment authorization across multiple transactions. As is the case with previous Figures, the temporal state of the flow in FIG. 7 can be assumed to follow that illustrated in FIG. 3 described above. That is, in the illustrated embodiment of FIG. 7, at least one eligible payment authorization (e.g., auth 1) with available funds may be present with reusable authorization data store 102. In the example illustrated, an authorization meeting these requirements is illustrated as having $20 in unassigned funds (i.e., funds available to be reassigned to one or more transactions). As described above with respect to FIG. 3, these funds may have been made available as the result of the cancellation of one or more items or an entire order.

In the illustrated embodiment, order handling system 106 may issue an initiate operation in the amount of $12 for a second transaction (an amount of funds less than the original authorization amount of $20), as illustrated at 700. Instead of immediately issuing an authorization request in response to operation 700, authorization reusability component 100 may instead check for existing eligible authorizations, as illustrated at 702. In the illustrated embodiment, authorization reusability component 100 locates an eligible existing payment authorization record in reusable authorization data store 102. As noted above, such payment authorization record may be the payment authorization record last updated at action 302 of FIG. 3. Instead of acquiring a new authorization, authorization reusability component 100 may effectively reuse the existing authorization by reassigning the already authorized funds to the second transaction, as illustrated at 704. In the illustrated embodiment, the second transaction is for an amount of $12; the payment authorization record is updated to indicate $8 remain unassigned to a transaction (i.e., $12 of the authorized funds have been assigned to a transaction).

In the illustrated embodiment, order handling system 106 may also issue another initiate operation in the amount of $8 for a third transaction (an amount of funds less than or equal to the remaining unassigned funds of authorization 1), as illustrated at 706. Again, instead of immediately issuing an authorization request in response to operation 706, authorization reusability component 100 may instead check for existing eligible authorizations, as illustrated at 708. In the illustrated embodiment, authorization reusability component 100 identifies authorization 1 as being eligible to be used for the third transaction (i.e., the transaction corresponding to operation 706). At 710, authorization reusability component 100 may update the existing payment authorization record to indicate that the remaining funds (i.e., $8) have been assigned to the third transaction. In this way, different portions of funds of the same existing payment authorization may be reassigned to multiple different transactions in various embodiments. In many cases, this may increase the utilization of payment authorizations and minimize instances in which the payment management system 104 needs to request new payment authorizations from the payment processing entity. The processing of the transactions continues according to the flow described below with respect to FIG. 8.

FIG. 8 illustrates operations for finalizing the transactions that share a common payment authorization, as well as settling that payment authorization. In the illustrated embodiment of FIG. 8, the temporal state of the flow can be assumed to follow that illustrated in FIG. 7 described above. As illustrated at operation 800, order handling system 106 may issue a finalize operation for the second transaction in the amount of $12. In response, authorization reusability component 100 may update the payment authorization record at 802 to indicate that $12 of the reserved funds have been finalized. However, instead of immediately performing a corresponding settlement for the $12, authorization reusability component may delay such settlement until all other outstanding transactions assigned to that authorization are finalized or canceled. For instance, in the illustrated embodiment, authorization reusability component 100 may delay settlement until sometime after finalize operation 804 has been received in the amount of $8. As illustrated at 806, authorization reusability component 100 may update the payment authorization record (for authorization 1) to indicate that the remaining $8 have been assigned to the third transaction. At this point, all funds ($20) of the authorization are indicated as being finalized and no funds are unassigned. At 808 payment management system may issue a settlement request 808 in the amount of $20 to the payment processor system 112 of the payment processing entity and receive a response 810 indicating that the funds have been settled. In response, authorization reusability component 100 may close the authorization as illustrated at operation 812 to indicate that funds of that payment authorization are not available to be reassigned to any other transaction. In some embodiments, the payment authorization may be designated as closed at other times. For instance, a payment authorization may be designated as closed prior to performing operation 808 and receiving response 810. As described above with respect to previous Figures, closing the payment authorization in this manner may prevent conflicts among different transactions competing for the same payment authorizations.

In some embodiments, authorization reusability component 100 may implement a timer or other temporal logic in order to ensure that an authorization is at least used for settling all currently finalized transaction(s), such as in cases where one or more other transactions are not finalized by a certain time threshold (e.g., a time threshold relative to the expiration of the respective payment authorization). For instance, within the context of FIG. 8 described above, authorization reusability component 100 may implement a timer or other temporal logic to ensure that, if finalize operation 804 is not received by a certain time (e.g., a certain time prior to expiration of the respective payment authorization), the settlement associated with finalize operation 800 may still be performed. In this way, even if one transaction is running late, at least a portion of the funds of the payment authorization will be utilized for settlement. In cases where finalization of a transaction misses such time threshold, an additional payment authorization may be acquired for settling that transaction. In other cases, some other existing payment authorization may be utilized for settling such transaction.

Predictive Techniques for Sharing a Payment Authorization

In various embodiments, predictive techniques may be utilized to share payment authorizations across multiple transactions. These techniques may utilize knowledge of transactions that are expected to occur in the future in order to generate an authorization request for a quantity of funds predicted to be needed in the future (e.g., a quantity of funds sufficient for at least one known transaction and at least one expected transaction). For example, consider a scenario in which a customer places an order for two items. As described above, due to the nature of a merchant's fulfillment network, these items may be fulfilled as different shipments processed as different transactions. In some cases, these transactions may be processed at different times due to variations in the preparation and shipping of the corresponding shipments at different facilities. Based on such information, authorization reusability component 100 may predict when different transactions are expected to be initiated and request larger payment authorizations to accommodate transactions that are expected to be initiated within a configurable time period. For instance, for a given transaction that has been initiated, authorization reusability component 100 may generate a payment authorization request for that transaction's requisite funds as well as additional funds for one or more transactions expected be initiated within a certain period of time. As noted, this period of time may be configured such that transactions that are not expected to be initiated soon are not included in the amount requested for payment authorization. Examples of these techniques are described in more detail below with respect to FIGS. 9 and 10.

Figure 9:
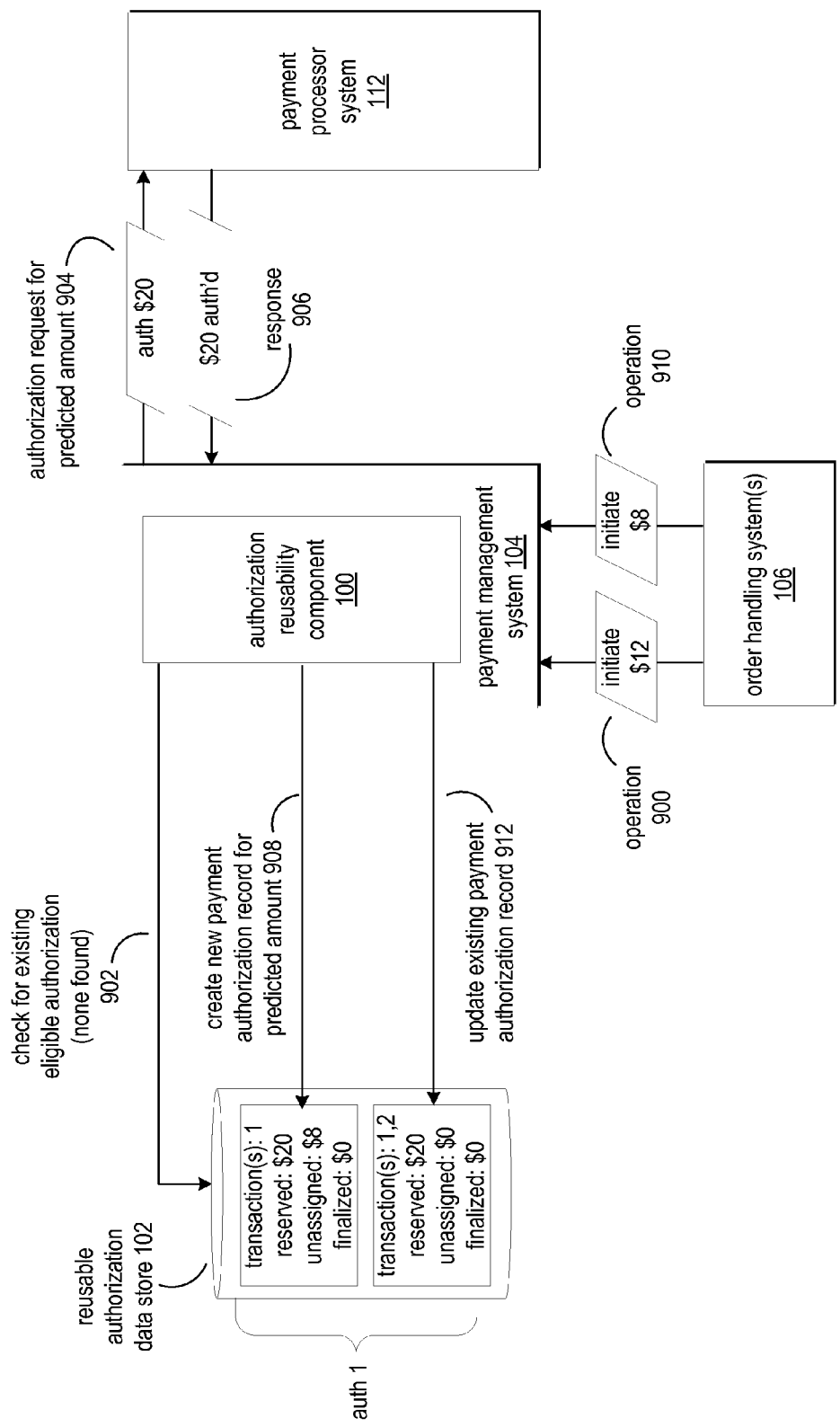
FIGS. 9-10 illustrate flow diagrams for sharing a payment authorization among multiple transactions by using a predictive authorization, according to some embodiments.

FIG. 9 illustrates a flow diagram of an example process for requesting payment authorization based on a predicted amount of funds that will be needed for a current transaction and one or more future transactions. As illustrated at 900, order handling system 106 may be configured to submit an initiate operation in the amount of $12 for a first transaction. As illustrated at 902, the authorization reusability component may check for any existing authorizations that are eligible to be used for the transaction. In this particular case, there are no existing authorizations that are eligible to be used for the transaction. In response, authorization reusability component 100 may determine that a payment authorization request is to be submitted. However, unlike some other examples described herein, authorization reusability component may first determine whether any other eligible transactions are expected to be initiated soon (e.g., "soon" as defined by a configurable time period relative to the current time); an eligible transaction may be a transaction associated with one or more of the same customer, same payment instrument, and/or same order according to various embodiments. In various embodiments, transactions may correspond to shipments and determining whether eligible transactions are expected to be initiated soon may include determining that the preparation of such shipments at a materials handling facility is expected to be initiated soon (e.g., "soon" as defined by a configurable time period relative to the current time).

In the illustrated embodiment, authorization reusability component 100 may determine that a second transaction in the amount of $8 is expected to be initiated soon. In response to such determination, the authorization reusability component may generate an authorization request for a quantity of funds that is larger than the quantity of funds needed for the first transaction. For instance, authorization reusability component 100 may sum the quantity of funds needed by the first transaction and the second transaction and submit an authorization request equal to or greater than that sum. In this way, the corresponding payment authorization may be shared among the first and second transactions thereby bypassing the need to submit an additional payment authorization request for the second transaction. This may benefit the merchant in that per-authorization request fees charged by the payment processing entity may be reduced relative to scenarios in which the predictive payment authorizations are not utilized. Additionally, since payment authorization requests typically correspond to a given transaction that the customer sees on their payment instrument statements (e.g., a credit card statement), the customer may experience the added convenience of having an entire order (or at least multiple items of an order) appear as a single entry on their payment instrument statement. In many cases, this may reduce customer confusion over billing details as well as decrease the quantity of instances in which customer's contact the merchant in regard to such confusion.

As illustrated at 904, the actual amount requested for authorization is $20 (e.g., the sum of the $12 transaction and the $8 transaction). At 906, the payment management system may receive a response from the payment processor system 112 that indicates the authorization is successful. In response to the successful authorization, authorization reusability component 100 may generate a new payment authorization record 208, which may be stored in reusable authorization data store 102. In the illustrated embodiment, order handling system 106 may also issue another initiate operation in the amount of $8 for a second transaction (an amount of funds less than or equal to the remaining unassigned funds of authorization 1), as illustrated at 910. Instead of immediately issuing an authorization request in response to operation 910, authorization reusability component 100 may determine that the second transaction may be settled using the unassigned funds of the payment authorization created based on the predicted quantity of funds needed.

Figure 10:
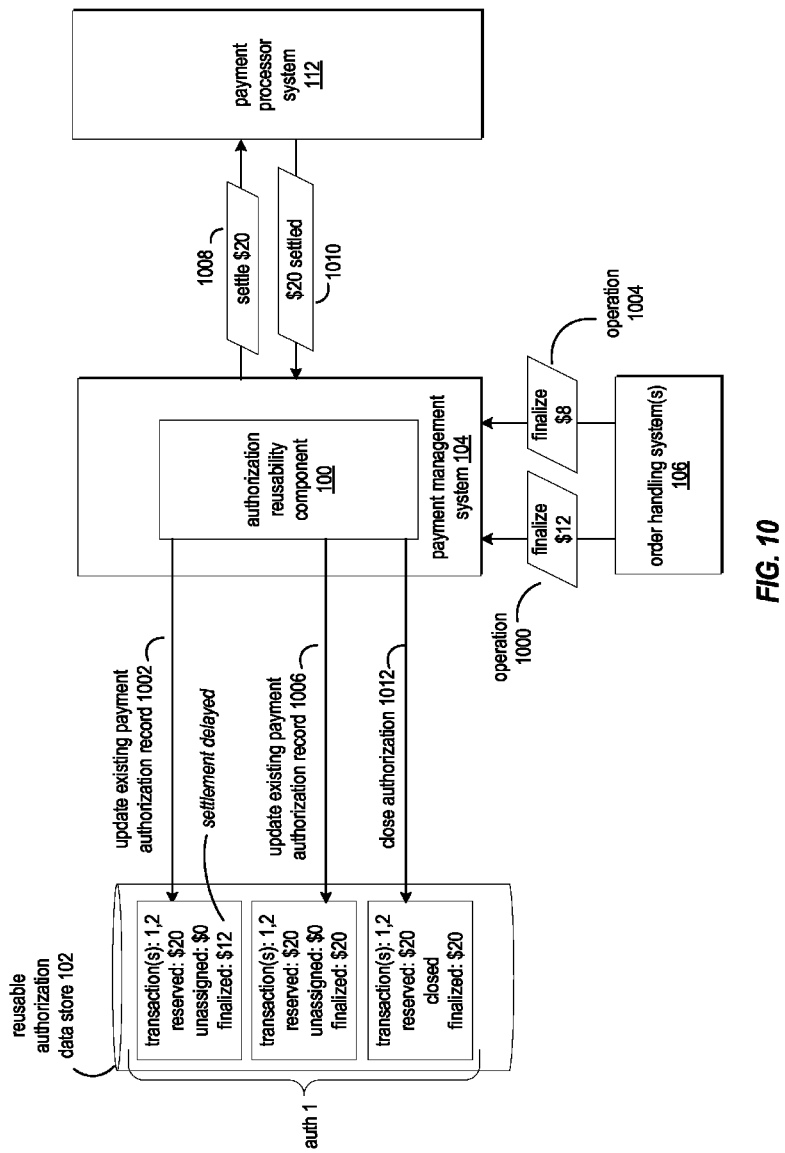

FIG. 10 illustrates a flow diagram of the settlement of multiple transactions with funds of a payment authorization obtained through the predictive techniques described above. In the illustrated embodiment, the temporal state of the flow can be assumed to follow that illustrated in FIG. 9 described above. As illustrated at operation 1000, order handling system 106 may issue a finalize operation for the first transaction in the amount of $12. In response, authorization reusability component 100 may update the payment authorization record at 1002 to indicate that $12 of the reserved funds have been finalized. However, instead of immediately performing a corresponding settlement for the $12, authorization reusability component may delay such settlement until all other outstanding transactions assigned to that authorization are finalized or canceled. For instance, in the illustrated embodiment, authorization reusability component 100 may delay settlement until sometime after finalize operation 1004 has been received in the amount of $8. As illustrated at 1006, authorization reusability component 100 may update the payment authorization record (for authorization 1) to indicate that the remaining $8 have been assigned to the second transaction. At this point, all funds ($20) of the authorization are indicated as being finalized and no funds are unassigned. At 1008 payment management system may issue a settlement request 808 in the amount of $20 to the payment processor system 112 of the payment processing entity and receive a response 1010 indicating that the funds have been settled. In response, authorization reusability component 100 may close the authorization as illustrated at operation 1012 to indicate that funds of that payment authorization are not available to be reassigned to any other transaction. In some embodiments, the payment authorization may be designated as closed at other times. For instance, a payment authorization may be designated as closed prior to performing operation 1008 and receiving response 1010. As described above with respect to previous Figures, closing the payment authorization in this manner may prevent conflicts among different transactions competing for the same payment authorizations.

In some embodiments, unlike the scenario illustrated in FIGS. 9-10, the second transaction (e.g., the transaction corresponding to operations 910 and 1004) may be canceled or may not occur in a timely manner. In these cases, authorization reusability component may either settle the first transaction or reassign the available funds of the payment authorization to some other eligible transaction (e.g., to avoid delays in the processing of the first transaction).

Funds Release for Certain Payment Instruments

Instead of resulting in a payment authorization for a quantity of funds to be acquired at a later time (e.g., as may be the case for credit cards), some payment instruments (e.g., debit cards or ATM cards) may result in an upfront charge (or debit) of funds from an account associated with the payment instrument. For instance, debit cards are one example of such a payment instrument where an exchange funds is actually performed upon or near the time at which the merchant charge the customer's payment instrument. The payment management system and authorization reusability component described herein may be configured to efficiently manage funds charged in order to avoid scenarios in which a customer's payment instrument is charged for funds, subsequently refunded funds (e.g., due to an item/order cancellation or a change in the materials handling facility tasked with shipment preparation, as described above), and then subsequently re-charged for funds (e.g., when an item is reordered or when an item is reassigned to a new materials handling facility). To achieve these operating characteristics, authorization reusability component 100 may be configured to place charged funds in a hold state in order to opportunistically use such funds for transactions that are predicted to occur within a certain time period (e.g., similar to the predictive techniques described above for payment authorizations). Examples of these techniques are described below with respect to FIGS. 11 and 12.

Figure 11:
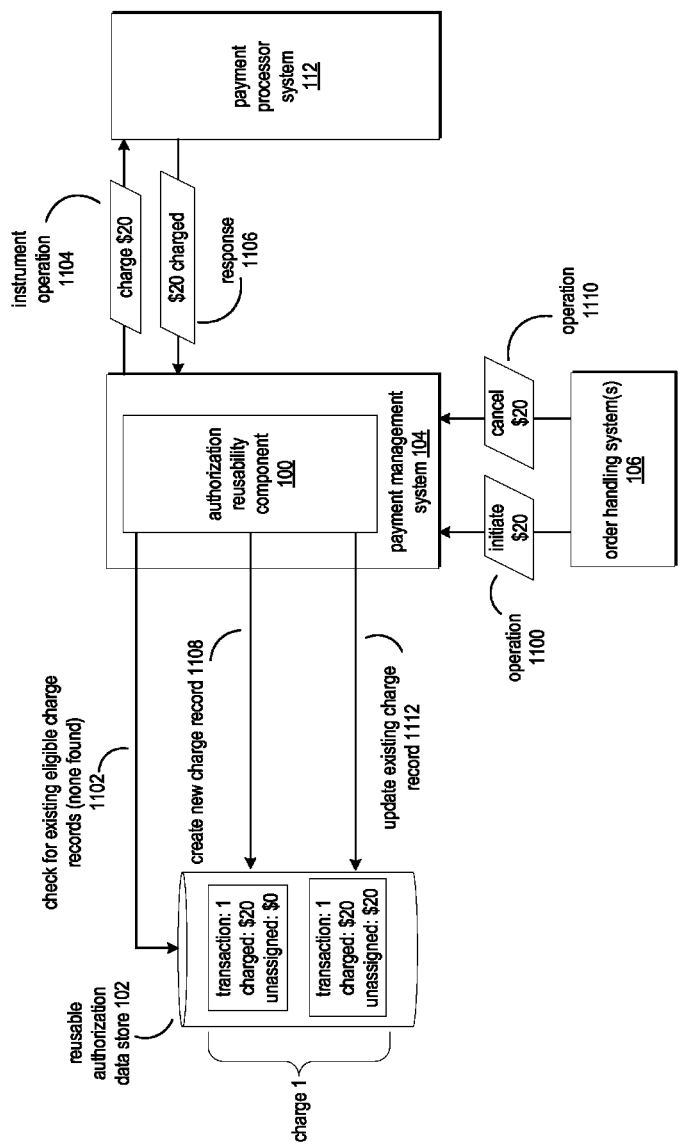
FIGS. 11-12 illustrate flow diagrams for partial reuse of charged funds, according to some embodiments.

FIG. 11 illustrates a flow diagram of the payment management system operation in the presence of a full cancellation of the funds originally charged for a transaction. In the illustrated embodiment, order handling system 106 may issue an initiate operation in the amount of $20, as illustrated by operation 1100. In various embodiments, the operations may also specify payment instrument information that indicates the payment instrument is a debit card (or other payment instrument for which funds are charged up front). Instead of immediately issuing a charge for $20, authorization reusability component 100 may check data store 102 for any existing eligible charge records that have funds available for use, as illustrated at 1102. In this particular case, no such records are found. The payment management system 104 may then issue instrument operation 1104 to payment processor system 112 in order to charge the customer's payment instrument for the requisite funds. In this case the charge is successful; the payment management system receives a response message indicating the successful charge at 1106. In response, authorization reusability component 100 may generate a new charge record as illustrated at 1108. The charge record indicates that $20 has been charged and assigned to transaction 1. As such, $0 remain unassigned. However, as illustrated at 1110, at some point in time a cancel operation is received that indicates the charged funds are no longer needed. For instance, situations similar to those described above with respect to previous Figures may occur (e.g., an item/order cancellation or a change to which materials handling facility is assigned to prepare the corresponding shipment). Instead of immediately refunding the charged funds back to the customer (e.g., through a refund operation issued to payment processor system 112), authorization reusability component 100 may update the existing charge record 1112 to indicate that $20 (i.e., the full quantity of funds originally charged for the transaction) of the charge record are now unassigned (e.g., not assigned to a transaction). As described in more detail below, funds that have been charged but are unassigned may be reassigned to a different transaction. In various embodiments, such opportunistic reassignment of charged funds may be tantamount to reusing the funds because, in conventional systems, charged funds are typically returned to the customer immediately upon order cancellation.

Figure 12:
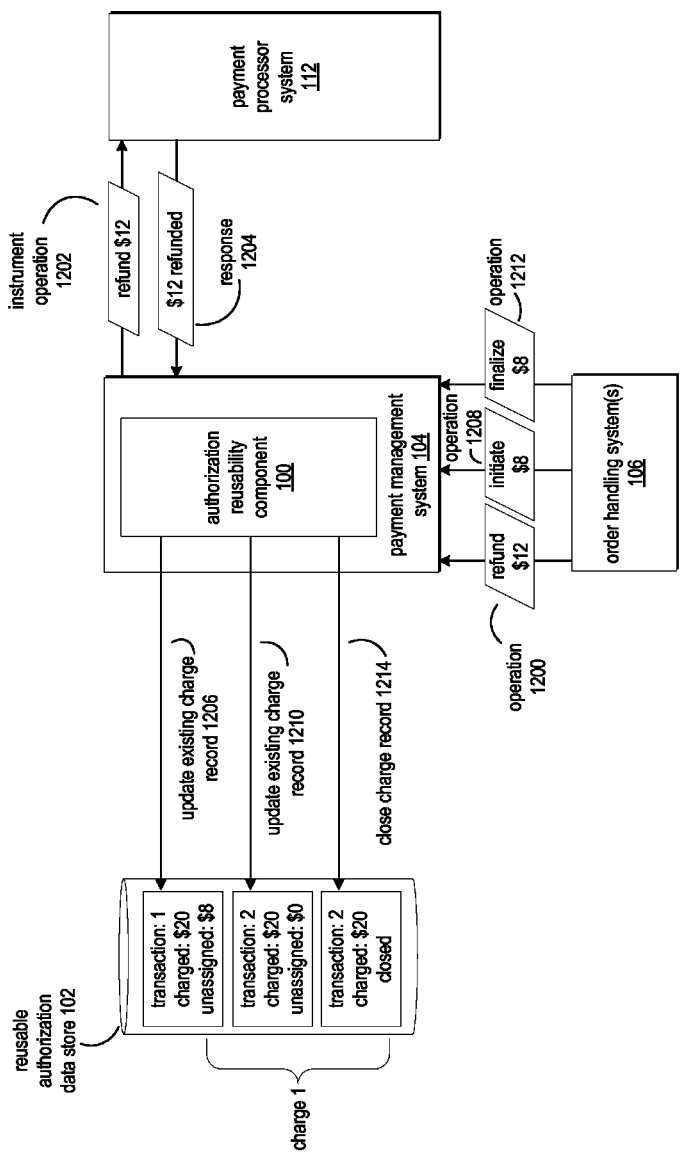

FIG. 12 illustrates a flow diagram for the partial release of previously charged funds, as well as the use of the remaining charged funds. In the illustrated embodiment, the temporal state of the flow can be assumed to follow that illustrated in FIG. 11 described above. At operation 1200, order handling system 106 may issue a refund operation in the amount of $12 to payment management system 104. For instance, it may be determined that only $8 of the previously charged funds are likely to be used based on expected shipping deadlines for eligible transactions (e.g., transactions of the same order, customer, and/or payment instrument). In this case, a refund may be issued for the remaining $12, as is the case in the illustrated embodiment. As illustrated at 1202, the payment management system 104 may issue a refund instrument operation. In this particular case, the operation is successful; payment processor system 112 issues a response 1204 that indicates $12 was refunded to the account associated with the customer's payment instrument. As illustrated at 1206, authorization reusability component may update the corresponding charge record to indicate that only the funds that have not been refunded (i.e., $8 in this example) are available to be reassigned to other transactions (as noted by the "unassigned: $8" transaction record entry).

As illustrated at 1208, an initiate operation may be issued for the remaining funds of the original $20 charged, in this case $8. Instead, of issuing a new charge for $8, authorization reusability component 100 may effectively reuse the previously charged funds by reassigning such funds to the second transaction. This is performed at 1210, where the authorization reusability component 100 issues an update to the charge record to reassign the remaining available funds to the second transaction. As illustrated at 1212, order handling system 106 may also issue a finalize operation in the amount of $8 to the payment management system, in which case the authorization reusability component 100 may close the charge record at 1214.

In cases where no eligible transaction is expected to occur (not illustrated in FIG. 12), authorization reusability component 100 may issue a full refund to the customer in order to minimize customer inconvenience. However, in cases where reuse is likely (e.g., an eligible transaction is expected to be initiated within a certain time period), the techniques described herein may save the merchant fees associated with scenarios in which a customer's payment instrument is charged for funds, subsequently refunded funds, and then subsequently re-charged for funds. In embodiments similar to FIG. 12, the act of re-charging the user a second time may be avoided by retaining enough of the charged funds to pay for future transaction initiations.

Example Methods

Figure 13:
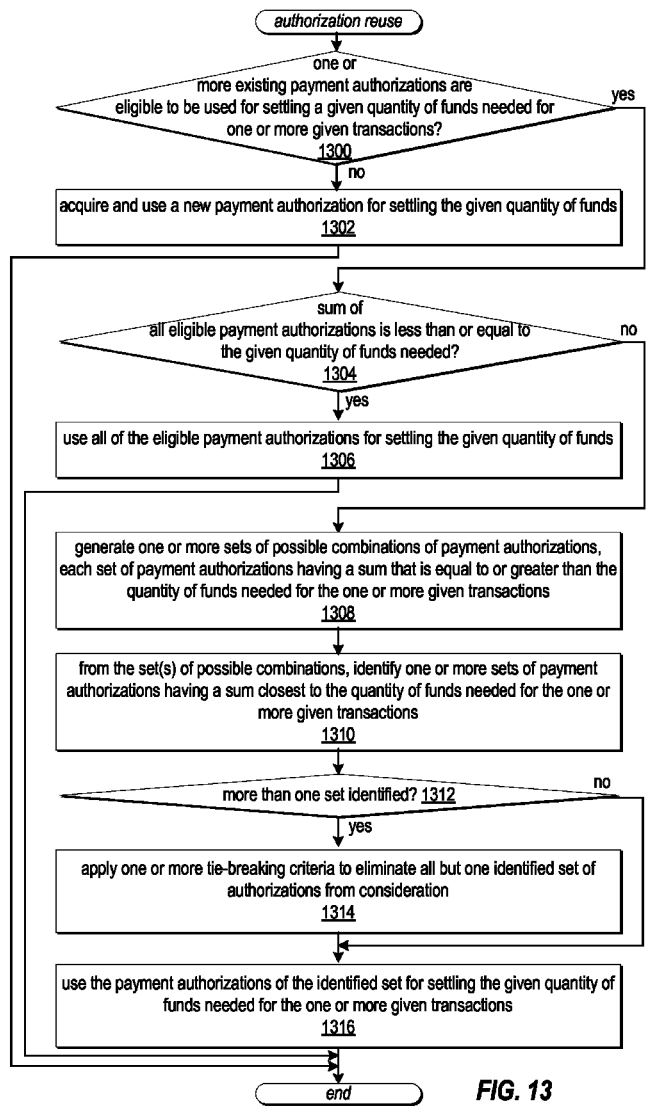
FIG. 13 illustrates a flowchart of an example method for reusing one or more existing payment authorizations for one or more transactions, according to some embodiments.

In various embodiments, methods may be utilized to perform aspects of the system and method for predictive payment authorizations. FIG. 13 illustrates a flowchart of an example method for reusing an existing payment authorization according to various embodiments. In various embodiments, the methods described herein may be performed by authorization reusability component 100 and/or payment management system 104. As illustrated at 1300, the method may include, for a given transaction, evaluating one or more existing payment authorization to determine whether one or more existing payment authorizations are eligible to be used for settling a given quantity of funds needed for one or more transactions. In various embodiments, an existing payment authorization may be a payment authorization that was obtained for some transaction other than the one or more transactions for which funds are needed. For instance, the payment authorization may be associated with a transaction associated with an order that was fully or partially cancelled. Examples of such payment authorization include the payment authorization represented by the payment authorizations that are stored in reusable payment authorization data store 102, as described above.

In various embodiments, the method may include using different criteria for determining whether an existing authorization is eligible to be used for the one or more given transactions. For instance, in some embodiments, the method may include determining that an existing payment authorization may be utilized if it shares one or more common properties with the one or more given transactions. For instance, the existing payment authorization and the one or more given transactions may be required to share the same customer, payment instrument, and/or order. In some cases, eligible payment authorizations may be required to have a common merchant category code. For instance, in some embodiments, if an item of the one or more given transactions were flagged with an 'adult' merchant category code, only payment authorizations acquired for an 'adult' merchant category code may be reused. In another example, the existing payment authorization and the one or more given transactions may be required to share the same receiving account associated with the merchant and/or the same account routing identifier associated with the merchant. For instance, business entities (e.g., a merchant or subsidiary thereof) may each utilize different receiving accounts and/or account routing identifiers for receiving funds from payment processing entities. In some cases, an existing authorization may not be permitted for reuse if the receiving account and/or the account routing identifier do not match those of the one or more given transactions. In some embodiments of the method, an authorization may be prohibited from being eligible if the authorization's expiration date (e.g., the date the reserved funds of the authorization will be released back to the customer's account) is sooner than a specified time (e.g., a rolling window of one week or some other specified time period).

As illustrated by the negative output of block 1300, the method may proceed to block 1302 if there is not at least one existing payment authorization that is eligible to be utilized to settle the one or more given transactions. At 1302, the method may include acquiring a new payment authorization for the given quantity of funds needed for settlement of the one or more given transactions (e.g., similar to the techniques describe above with respect to operations 204 and 206). As illustrated by the positive output of block 1300, the method may process to block 1304 if there are one or more existing payment authorizations that are eligible to be utilized to settle the one or more given transactions. At block 1304, the method includes determining whether the sum of all eligible payment authorizations is less than or equal to the given quantity of funds needed.

As illustrate by the positive output of block 1304, if the sum of all eligible payment authorizations is less than or equal to the given quantity of funds needed, the method may proceed to block 1306. At 1306, the method may include using all of the eligible payment authorizations for settling the given quantity of funds needed. For instance, if the sum of all eligible payment authorizations is equal to the given quantity of funds needed (e.g., if the sum of the payment authorizations and the funds needed are matched), the method may include using those payment authorizations for settling the one or more given transactions. Use of a payment authorization for settlement may include any of the settlement techniques described above with respect to previous Figures. However, if at 1306 the sum of all eligible payment authorizations is less than the given quantity of funds needed by a particular amount, the method may additionally include (not illustrated) issuing an additional payment authorization to cover the particular amount (e.g., as was described with respect to FIG. 6 above).

As illustrate by the negative output of block 1304, if the sum of all eligible payment authorizations is not less than or equal to the given quantity of funds needed (i.e., if the sum of all eligible payment authorizations is greater than the given quantity of funds needed), the method may proceed to block 1308. At 1308, the method may include generating one or more sets of possible combinations of payment authorizations; each set of payment authorizations may have a sum that is equal to or greater than the quantity of funds needed for the one or more given transactions (i.e., each set is sufficient for settlement of the amount of funds needed by the one or more given transactions). For instance, if $5 were needed for the one or more given transactions and payment authorizations in the amounts of $1, $2, $3, $4, and $5 were determined to be eligible (e.g., at block 1300), possible combinations of payment authorizations may include [$1,$2,$3], [$1,$3,$4], [$1,$4], [$1,$5], [$2,$3], [$2,$3,$4], [$3,$4], [$4,$5], and [$5].

In the example above, the list of combinations may be a non-exhaustive list that is optimized to preserve processing resources and/or time. For instance, some embodiments may utilize a recursive function that generates all possible sets of authorization that are greater than or equal to needed quantity of funds with the exception that whenever there is a possible result set that is greater than or equal to the requested amount, no further combinations of that set are generated. Under this technique, the combinations [$1,$2,$3,$4], [$1,$2,$3,$4,$5], [$1,$2,$3,$5] and so forth would not be generated. In yet other embodiments, optimization may not be utilized and all sets of possible combinations may be generated at 1308.

At block 1310, the method may include, from the set(s) of possible combinations (determined or generated at 1308), identifying one or more sets of payment authorizations having a sum closest to the quantity of funds needed for the one or more given transactions. (In various embodiments, because of the operations performed at 1308, no set evaluated at 1308 will have a sum less than the quantity of funds needed.) As illustrated by the negative output of block 1312, if there is only one set of payment authorization that is closest to the quantity of funds (i.e., there are no ties in regard to which set is closest), the method may proceed to block 1316 (described below). As illustrated by the positive output of block 1314, if there are two or more sets of payment authorization that are closest to the quantity of funds (i.e., there are is a tie among two or more sets in regard to which set is closest), the method may proceed to block 1314.

At block 1314, the method may include applying one or more tie-breaking criteria to eliminate all but one identified set of authorizations from consideration. In various embodiments, such criteria may include but is not limited to a criterion favoring the set that has the fewest members (i.e., the set with the fewest distinct payment authorizations), and/or a criterion favoring the set that has a payment authorization expected to expire before all payment authorizations of the other sets under consideration. In some cases, multiple criteria may be utilized on a weighted sum basis. In various embodiments, if after all criteria are utilized and there still exists two or more sets under consideration, eliminating all but one set in a random or pseudo-random fashion. For instance, one surviving set may be chosen randomly or pseudo-randomly, and all other sets may be removed from consideration. Once only one set remains, the method may proceed to block 1316. At block 1316, the method may include using the payment authorizations of the identified set for settling the given quantity of funds needed for the one or more given transactions. Use of a payment authorization for settlement may include any of the settlement techniques described above with respect to previous Figures.

Figure 14:
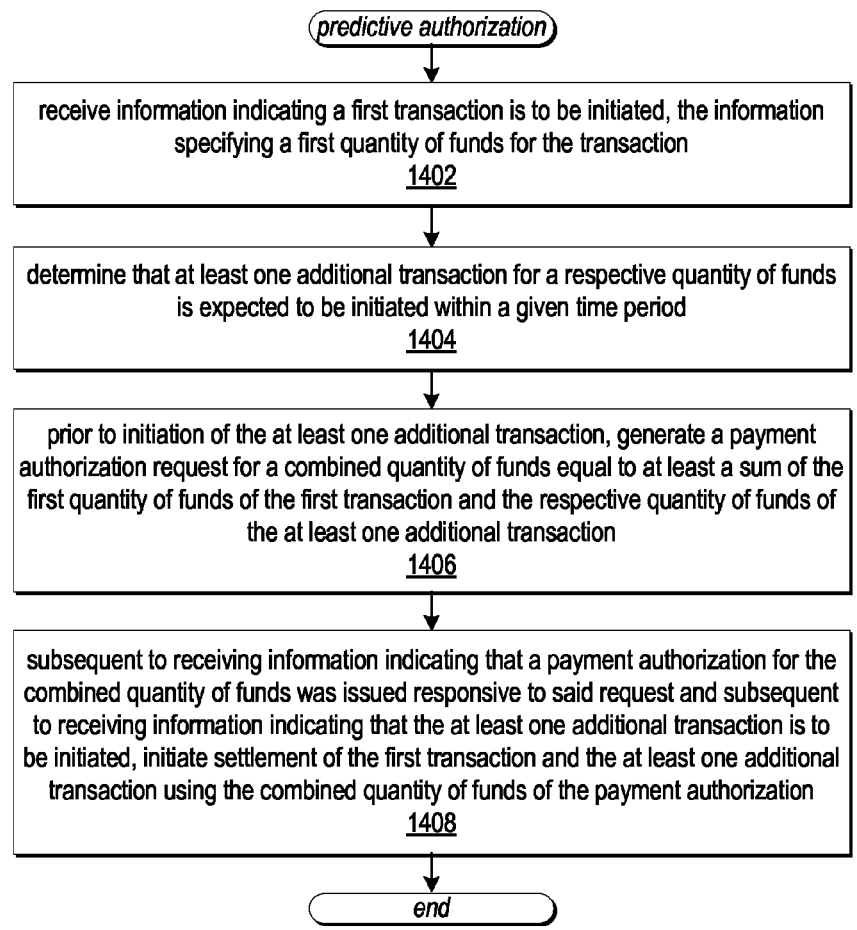
FIG. 14 illustrates a flowchart of an example method for predictive authorization, according to some embodiments.

FIG. 14 illustrates a flowchart of an example method for predictive authorization. Such predictive authorization may in various embodiments be similar to the techniques described above with respect to FIGS. 9-10. For instance, for a given transaction, a "larger-than-currently-needed" payment authorization may be acquired in order to accommodate transactions expected to occur in the near future. As described above, this may benefit the merchant in that per-authorization request fees charged by the payment processing entity may be reduced relative to scenarios in which the predictive payment authorizations are not utilized. Also as described above, since payment authorization requests typically correspond to a given transaction that the customer sees on their payment instrument statements (e.g., a credit card statement), the customer may experience the added convenience of having an entire order (or at least multiple items of an order) appear as a single entry on their payment instrument statement. In many cases, this may reduce customer confusion over billing details as well as decrease the quantity of instances in which customer's contact the merchant in regard to such confusion.

As illustrated at block 1402, the method may include receiving information indicating a first transaction is to be initiated. For instance, this portion of the method may include communicating with an order handling system to receive information that specifies transactions that are to be initiated. One example of such communication is described above with respect to operation 900 of FIG. 9.

As illustrated at block 1404, the method may include determining that at least one additional transaction for a respective quantity of funds is expected to be initiated within a given time period. This portion of the method may include any of the techniques described above with respect to FIG. 9. For instance, the method may include determining whether any other eligible transactions are expected to be initiated soon (e.g., "soon" as defined by a configurable time period relative to the current time); an eligible transaction may be a transaction associated with one or more of the same customer, same payment instrument, and/or same order according to various embodiments. In various embodiments, transactions may correspond to shipments, and determining whether eligible transactions are expected to be initiated soon may include determining that the preparation of such shipments at a materials handling facility is expected to be initiated soon (e.g., "soon" as defined by a configurable time period relative to the current time).

As illustrated by block 1406, the method may include, prior to initiation of the at least one additional transaction, generating a payment authorization request for a combined quantity of funds equal to at least a sum of the first quantity of funds of the first transaction and the respective quantity of funds of the at least one additional transaction. In various embodiments, this portion of the method may include any of the techniques described above with respect to generating authorization request 904. By generating a request for a larger-than-currently-needed payment authorization when additional eligible transactions are expected to occur soon, the corresponding payment authorization may be shared among the first transaction and the one or more additional transactions thereby bypassing the need to submit an additional payment authorization request for the additional transactions. As described, this may reduce fees paid by the merchant (e.g., reduce fees for authorization requests) and increase quality of the customer experience (e.g., multiple purchases consolidated into one line item on payment instrument statements, such as credit card statements).

As illustrated at 1408, the method may also include subsequent to receiving information indicating that a payment authorization for the combined quantity of funds was issued responsive to said request (e.g., receiving response 906 described above) and subsequent to receiving information indicating that the at least one additional transaction is to be initiated (e.g., receiving initiate operation 910 described above), initiate settlement of the first transaction and the at least one additional transaction using the combined quantity of funds of the payment authorization. For instance, this portion of the method may include settling multiple transactions with the same settlement, such as described above with respect to operations 1008 and 1010 of FIG. 10. In various embodiments, performing a single settle for multiple transactions may reduce fees paid by the merchant (e.g., reduce per-settlement request fees).

Example Computer System

Various embodiments of the system and method for predictive payment authorizations, as described herein, may be executed on one or more computer systems, which may interact with various other devices. Note that any component, action, or functionality described above with respect to FIGS. 1-14 may be implemented via one or more computer systems configured as computer system 1500 of FIG. 15, according to various embodiments. In the illustrated embodiment, computer system 1500 includes one or more processors 1510 coupled to a system memory 1520 via an input/output (I/O) interface 1530. Computer system 1500 further includes a network interface 1540 coupled to I/O interface 1530, and one or more input/output devices 1550, such as cursor control device 1560, keyboard 1570, and display(s) 1580. In some cases, it is contemplated that embodiments may be implemented using a single instance of computer system 1500, while in other embodiments multiple such systems, or multiple nodes making up computer system 1500, may be configured to host different portions or instances of embodiments. For example, in one embodiment some elements may be implemented via one or more nodes of computer system 1500 that are distinct from those nodes implementing other elements.

In various embodiments, computer system 1500 may be a uniprocessor system including one processor 1510, or a multiprocessor system including several processors 1510 (e.g., two, four, eight, or another suitable number). Processors 1510 may be any suitable processor capable of executing instructions. For example, in various embodiments processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

System memory 1520 may be configured to store program instructions 1522 and/or data 1532 accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions 1522 implementing payment management system 104 and/or authorization reusability component 100 are shown stored within program instructions 1522. Additionally, data 1532 of memory 1520 may store any of the information or data structures described above, the information stored in reusable authorization data store 102. In some embodiments, program instructions and/or data may be received, sent or stored upon different types of computer-accessible media or on similar media separate from system memory 1520 or computer system 1500. While computer system 1500 is described as implementing the functionality of payment management system 104 and/or authorization reusability component 100, any of the items described above (e.g., payment processor system, order handling systems, etc.) may be implemented via such a computer system.

In one embodiment, I/O interface 1530 may be configured to coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices (e.g., any payment processor system 112 or order handling system(s) 106 described above) attached to a network 1585 (e.g., any element of FIG. 1) or between nodes of computer system 1500. Network 1585 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, or any other devices suitable for entering or accessing data by one or more computer systems 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1522 configured to implement any element or action described above. In one embodiment, the program instructions may implement the methods described above, such as the methods illustrated by FIGS. 13-14 or the operations described with respect to FIGS. 1-12. In other embodiments, different elements and data may be included. Note that data 1532 may include any data or information described above, including but not limited to the information of reusable authorization data store 102.

Those skilled in the art will appreciate that computer system 1500 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1500 may be transmitted to computer system 1500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
   one or more memories; and
   one or more processors coupled to the one or more memories, wherein the one or more memories comprise program instructions executable by the one or more processors to implement a payment management system configured to:
   receive information indicating a first transaction is to be initiated, the information specifying a first quantity of funds for the transaction;
   in response to and subsequent to receipt of the information indicating the first transaction, determine that at least one additional transaction for a respective quantity of funds is expected to be initiated within a given time period and that the at least one additional transaction is eligible for authorization sharing with the first transaction, wherein at least some transactions are not eligible for authorization sharing;

prior to initiation of said at least one additional transaction, and responsive to and subsequent to said determine that at least one additional transaction for a respective quantity of funds is expected to be initiated and that the at least one additional transaction is eligible for authorization sharing with the first transaction, generate a payment authorization request for a combined quantity of funds equal to at least a sum of the first quantity of funds of the first transaction and the respective quantity of funds of said at least one additional transaction and transmit the payment authorization request to a processing system, wherein the combined quantity of funds is greater than needed for the first transaction; and subsequent to receiving information indicating that a payment authorization for the combined quantity of funds was issued responsive to said request and subsequent to receiving information indicating that said at least one additional transaction is to be initiated, initiate settlement of said first transaction and said at least one additional transaction using the combined quantity of funds of the payment authorization.

2. The system of claim 1, wherein to determine that at least one additional transaction for a respective quantity of funds is expected to be initiated within the given time period, the payment management system is configured to determine that preparation of at least one shipment corresponding to said at least one additional transaction is expected to be initiated prior to said given time period.

3. The system of claim 1, wherein the payment management system is configured to:
responsive to said payment authorization, generate a payment authorization record within a data store such that the payment authorization record indicates that a portion of the combined funds is assigned to said first transaction.

4. The system of claim 3, wherein the payment management system is configured to generate the payment authorization record such that the payment authorization record additionally indicates that a second portion of the combined funds is assigned to said at least one additional transaction.

5. The system of claim 1, wherein to initiate said settlement, the payment management system is configured to provide a settlement request to a payment processing entity.

6. The system of claim 1, wherein the payment management system is configured to, in response to the settlement of the first transaction and said at least one additional transaction, modify a stored payment authorization record such that an availability status of that record indicates that reserved funds associated with that authorization record cannot be unassigned from the first transaction and said at least one additional transaction.

7. The system of claim 1, wherein an eligible transaction comprises a transaction associated with a same customer, same payment instrument, or same order.

8. A method comprising:
performing, by one or more computing devices:
receiving information indicating a first transaction is to be initiated, the information specifying a first quantity of funds for the transaction;
in response to and subsequent to receiving the information indicating the first transaction, determining that at least one additional transaction for a respective quantity of funds is expected to be initiated within a given time period and that the at least one additional transaction is eligible for authorization sharing with the first transaction, wherein at least some transactions are not eligible for authorization sharing;

prior to initiation of said at least one additional transaction, and responsive to and subsequent to said determining that at least one additional transaction for a respective quantity of funds is expected to be initiated and that the at least one additional transaction is eligible for authorization sharing with the first transaction, generating a payment authorization request for a combined quantity of funds equal to at least a sum of the first quantity of funds of the first transaction and the respective quantity of funds of said at least one additional transaction and transmitting the payment authorization request to a processing system, wherein the combined quantity of funds is greater than needed for the first transaction; and responsive to said request, receiving information indicating that a payment authorization for the combined quantity of funds was issued.

9. The method of claim 8, wherein the method comprises, subsequent to receiving the information indicating the payment authorization was issued and subsequent to receiving information indicating that said at least one additional transaction is to be initiated, initiating settlement of said first transaction and said at least one additional transaction using the combined quantity of funds of the payment authorization.

10. The method of claim 9, wherein said initiating comprises providing a settlement request to a payment processing entity.

11. The method of claim 8, wherein the method comprises, in response to settlement of the first transaction and said at least one additional transaction, modifying a stored payment authorization record such that an availability status of that record indicates that reserved funds associated with that authorization record cannot be unassigned from the first transaction and said at least one additional transaction.

12. The method of claim 8, wherein determining that at least one additional transaction for a respective quantity of funds is expected to be initiated within the given time period comprises determining that preparation of at least one shipment corresponding to said at least one additional transaction is expected to be initiated prior to said given time period.

13. The method of claim 8, further comprising:
responsive to said payment authorization, generating a payment authorization record within a data store such that the payment authorization record indicates that a portion of the combined funds is assigned to said first transaction.

14. The method of claim 13, wherein the method comprises generating the payment authorization record such that the payment authorization record additionally indicates that a second portion of the combined funds is assigned to said at least one additional transaction.

15. A non-transitory computer-readable storage medium, storing program instructions computer-executable on a computer to implement a payment management system configured to:
receive information indicating a first transaction is to be initiated, the information specifying a first quantity of funds for the transaction;
in response to and subsequent to receipt of the information indicating the first transaction, determine that at least one additional transaction for a respective quantity of funds is expected to be initiated within a given time period and that the at least one additional transaction is eligible for authorization sharing with the first transaction, wherein at least some transactions are not eligible for authorization sharing; and prior to initiation of said at least one additional transaction, and responsive to and subsequent to said determine that at least one additional transaction for a respective quantity of funds is expected to be initiated and that the at least one additional transaction is eligible for authorization sharing with the first transaction, generate a payment authorization request for a combined quantity of funds equal to at least a sum of the first quantity of funds of the first transaction and the respective quantity of funds of said at least one additional transaction and transmit the payment authorization request to a processing system, wherein the combined quantity of funds is greater than needed for the first transaction.

16. The non-transitory computer-readable storage medium of claim 15, wherein the payment management system is configured to, subsequent to receiving information indicating that a payment authorization for the combined quantity of funds was issued responsive to said request and subsequent to receiving information indicating that said at least one additional transaction is to be initiated, initiate settlement of said first transaction and said at least one additional transaction using the combined quantity of funds of the payment authorization.

17. The non-transitory computer-readable storage medium of claim 16, wherein to perform said settlement the payment management system is configured to provide a settlement request to a payment processing entity.

18. The non-transitory computer-readable storage medium of claim 15, wherein the payment management system is configured to, in response to settlement of the first transaction and said at least one additional transaction, modify a stored payment authorization record such that an availability status of that record indicates that reserved funds associated with that authorization record cannot be unassigned from the first transaction and said at least one additional transaction.

19. The non-transitory computer-readable storage medium of claim 15, wherein to determine that at least one additional transaction for a respective quantity of funds is expected to be initiated within the given time period the payment management system is configured to determine that preparation of at least one shipment corresponding to said at least one additional transaction is expected to be initiated prior to said given time period.

20. The non-transitory computer-readable storage medium of claim 15, wherein the payment management system is configured to:

responsive to said payment authorization, generate a payment authorization record within a data store such that the payment authorization record indicates that a portion of the combined funds is assigned to said first transaction.

21. The non-transitory computer-readable storage medium of claim 20, wherein the payment management system is configured to generate the payment authorization record such that the payment authorization record additionally indicates that a second portion of the combined funds is assigned to said at least one additional transaction.

\* \* \* \* \*